United States Patent
Srivastava

(10) Patent No.: US 9,679,097 B2
(45) Date of Patent: Jun. 13, 2017

(54) SELECTIVE POWER STATE TABLE COMPOSITION

(71) Applicant: Mentor Graphics Corporation, Wilsonville, OR (US)

(72) Inventor: Amit Srivastava, Noida (IN)

(73) Assignee: Mentor Graphics Corporation, Wilsonville, OR (US)

( * ) Notice: Subject to any disclaimer, the term of this patent is extended or adjusted under 35 U.S.C. 154(b) by 47 days.

(21) Appl. No.: 14/608,567

(22) Filed: Jan. 29, 2015

(65) Prior Publication Data

US 2015/0220678 A1     Aug. 6, 2015

(30) Foreign Application Priority Data

Jan. 31, 2014  (IN) .............................. 438/CHE/2014

(51) Int. Cl.
*G06F 17/50*     (2006.01)
(52) U.S. Cl.
CPC ...... *G06F 17/5081* (2013.01); *G06F 2217/78* (2013.01)
(58) Field of Classification Search
CPC . G06F 17/5081; G06F 2217/78; G06F 9/5094

USPC .......................................................... 716/109
See application file for complete search history.

(56) References Cited

U.S. PATENT DOCUMENTS

| | | | |
|---|---|---|---|
| 8,601,426 B1* | 12/2013 | Du ............................... | 716/133 |
| 8,683,419 B1* | 3/2014 | Hines et al. .................. | 716/133 |
| 2015/0121326 A1* | 4/2015 | De et al. ....................... | 716/108 |

\* cited by examiner

*Primary Examiner* — Suchin Parihar
(74) *Attorney, Agent, or Firm* — Mentor Graphics Corporation

(57) ABSTRACT

This application discloses a computing system to identify an interconnection between portions of a circuit design corresponding to different power domains. The computing system can select a subset of power state tables in the circuit design based, at least in part, on power supplies associated with the interconnection, and generate a composite power state table from the selected subset of power state tables. The computing system can analyze the interconnection to identify electrical characteristics based, at least in part, on power states in the composite power state table, and determine whether a power intent specification in the circuit design can prompt synthesis of interface circuitry capable of implementing the electrical characteristics for the interconnection.

17 Claims, 11 Drawing Sheets

DEPENDENCE GRAPH

| POWER SUPPLY COMBINATIONS 631 | POWER STATE TABLE COMPOSITIONS 632 |
|---|---|
| A,B | PST 601 |
| A,C | PST 602 |
| A,D | PST 601 + PST 603 |
| B,C | PST 601 + PST 602 |
| B,D | PST 603 |
| C,D | PST 601 + PST 602 + PST 603 |
| A,B,C | PST 601 + PST 602 |
| A,B,D | PST 601 + PST 603 |
| A,C,D | PST 601 + PST 602 + PST 603 |
| B,C,D | PST 601 + PST 602 + PST 603 |
| A,B,C,D | PST 601 + PST 602 + PST 603 |

SELECTIVE POWER STATE TABLE COMPOSITION

RELATED APPLICATIONS

This claims priority under §119 to Indian Patent Application No. 438/CHE/2014, entitled "Selective Power State Table Composition," filed Jan. 31, 2014, which is incorporated herein by reference in its entirety.

TECHNICAL FIELD

This application is generally related to electronic design automation and, more specifically, to selective power state table composition.

BACKGROUND

Microdevices, such as integrated microcircuits and microelectromechanical systems (MEMS), are used in a variety of products, from automobiles to microwaves to personal computers. Designing and fabricating microdevices typically involves many steps, known as a "design flow." The particular steps of a design flow often are dependent upon the type of microcircuit, its complexity, the design team, and the microdevice fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows for integrated microcircuits. Initially, the specification for a new circuit is transformed into a logical design, sometimes referred to as a register transfer level (RTL) description of the circuit. With this logical design, the circuit can be described in terms of both the exchange of signals between hardware registers and the logical operations that can be performed on those signals. The logical design typically employs a Hardware Design Language (HDL), such as the Very high speed integrated circuit Hardware Design Language (VHDL). As part of the creation of a logical design, a designer will also implement a place-and-route process to determine the placement of the various portions of the circuit, along with an initial routing of interconnections between those portions. The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices, such as transistors, resistors, and capacitors, which will be used in the circuit, along with their interconnections. This device design generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the desired functions. This analysis is sometimes referred to as "formal verification."

Once the relationships between circuit devices have been established, the design can be again transformed, this time into a physical design that describes specific geometric elements. This type of design often is referred to as a "layout" design. The geometric elements, which typically are polygons, define the shapes that will be created in various materials to manufacture the circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Typically, a designer will perform a number of analyses on the resulting layout design data. For example, with integrated circuits, the layout design may be analyzed to confirm that it accurately represents the circuit devices and their relationships as described in the device design. The layout design also may be analyzed to confirm that it complies with various design requirements, such as minimum spacings between geometric elements. Still further, the layout design may be modified to include the use of redundant geometric elements or the addition of corrective features to various geometric elements, to counteract limitations in the manufacturing process, etc. For example, the design flow process may include one or more resolution enhancement technique (RET) processes, that modify the layout design data to improve the usable resolution of the reticle or mask created from the design in a photolithographic manufacturing process.

After the layout design has been finalized, it is converted into a format that can be employed by a mask or reticle writing tool to create a mask or reticle for use in a photolithographic manufacturing process. The written masks or reticles then can be used in a photolithographic process to expose selected areas of a wafer to light or other radiation in order to produce the desired integrated microdevice structures on the wafer.

Returning to "functional verification," this type of analysis begins with a circuit design coded at a register transfer level (RTL), which can be simulated by a design verification tool. A designer, for example, utilizing the design verification tool, can generate a test bench that can allow the design verification tool to analyze or verify the functionality of the simulated circuit design. There can be many different types of design verification tools, which can verify a variety of circuit design types, such as analog designs, digital designs, mix signal designs, combinations thereof, or the like, or specific architectural implementations, such as multiple clock-domain schemes, active power management schemes, or the like.

For active power management architectures, a design verification tool implementing power aware simulation, sometimes called a power aware design verification tool, can modeling an active power management scheme while simulating the circuit design. Since coding at the register transfer level does not include power domain-related circuitry, the circuit design can be annotated with a power intent, for example, expressed in a Unified Power Format (UPF) specification described by Institute of Electrical and Electronics Engineers (IEEE) Standard 1801. The power intent can include description of various power domain-related design intentions, such as power supply nets, power states, power controls, electrical protection schemes, memory retention schemes, or the like. Given the description of power intent, the power aware design verification tool can partition the circuit design into power domains, synthesize circuitry, such as isolation cells, level-shifting cells, retention cells, or the like, and integrate a power supply network into the circuit design to power each power domain. The augmented circuit design can then be simulated with control over power states for each domain, allowing for accurate modeling of active power management on design functionality.

The power aware design verification tool can perform various static checks, for example, during compilation of the circuit design and corresponding power intent, to identify architectural issues, such as missing or inadequate isolation or level-shifting cells in the power intent, prior to synthesis of any isolation or level-shifting cells from the power intent. For example, the power aware design verification tool can analyze the circuit design to determine where the circuit design may want to include isolation or level-shifting cells, such as at interconnections between different power domains, and then utilize power states of the different power domains, i.e., described in one or more power state tables of the power intent, to determine whether the power intent is missing or includes inadequate description of isolation or level-shifting cells.

Due to the complexity of many circuit designs, rather than have one monolithic power state table that describes every available power state in the circuit design, many power intent specifications include multiple power state tables that each include one or more power states for various combinations of power supplies available in the circuit design. When faced with an interconnection between different power domains to analyze, the power aware design verification tool can analyze the interconnection when the power states of the different power domains are described in one of the power state tables. Otherwise, the power aware design verification tool can indicate that the interconnection and any corresponding isolation or level-shifting cells were not analyzed for lack of an adequate power state table in the power intent specification.

SUMMARY

This application discloses tools and mechanisms for power domain analysis utilizing composite power state tables. According to various embodiments, the tools and mechanisms can identify an interconnection between portions of a circuit design corresponding to different power domains. The tools and mechanisms can select a subset of power state tables in the circuit design based, at least in part, on power supplies associated with the interconnection, and generate a composite power state table from the selected subset of power state tables. The tools and mechanisms can analyze the interconnection to identify electrical characteristics based, at least in part, on power states in the composite power state table, and determine whether a power intent specification in the circuit design can prompt synthesis of interface circuitry capable of implementing the electrical characteristics for the interconnection.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
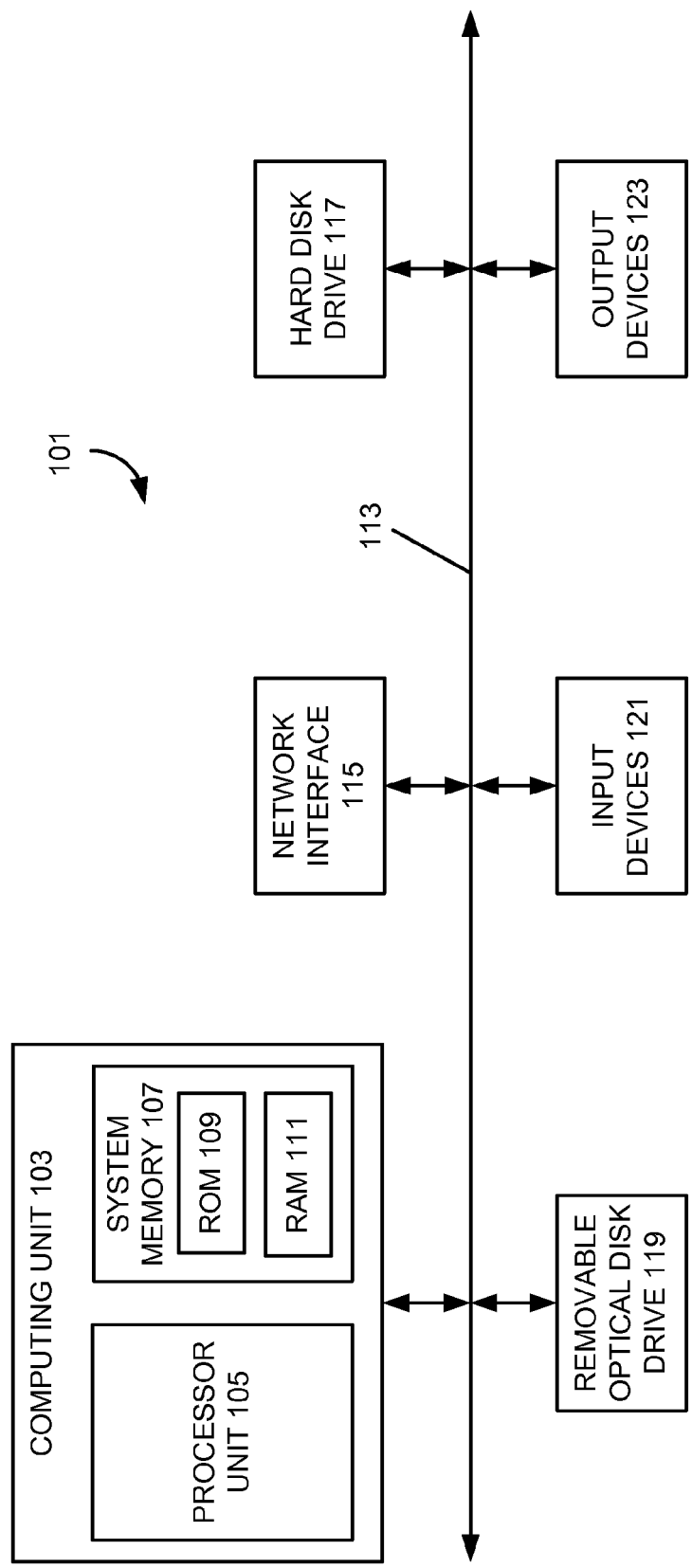
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computer 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to one or more network interfaces for communicating with other devices making up a network. The network interface translates data and control signals from the computing unit 103 into network messages according to one or more communication protocols, such as the transmission control protocol (TCP) and the Internet protocol (IP). Also, the interface may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
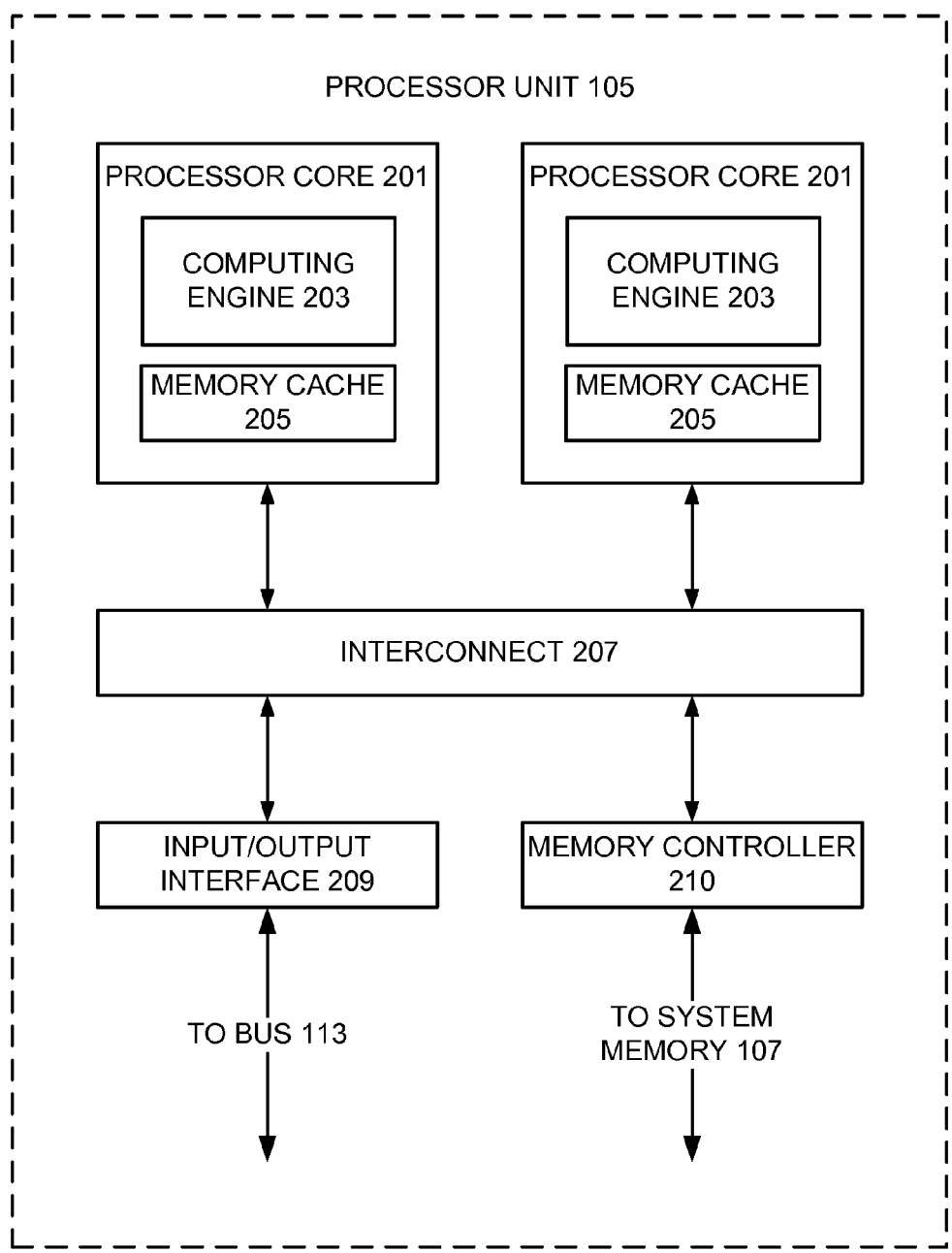

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210 The input/output interface 209 provides a communication interface between the processor unit 201 and the bus 113. Similarly, the memory controller 210 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Power Aware Static Check and Simulation

Figure 3:
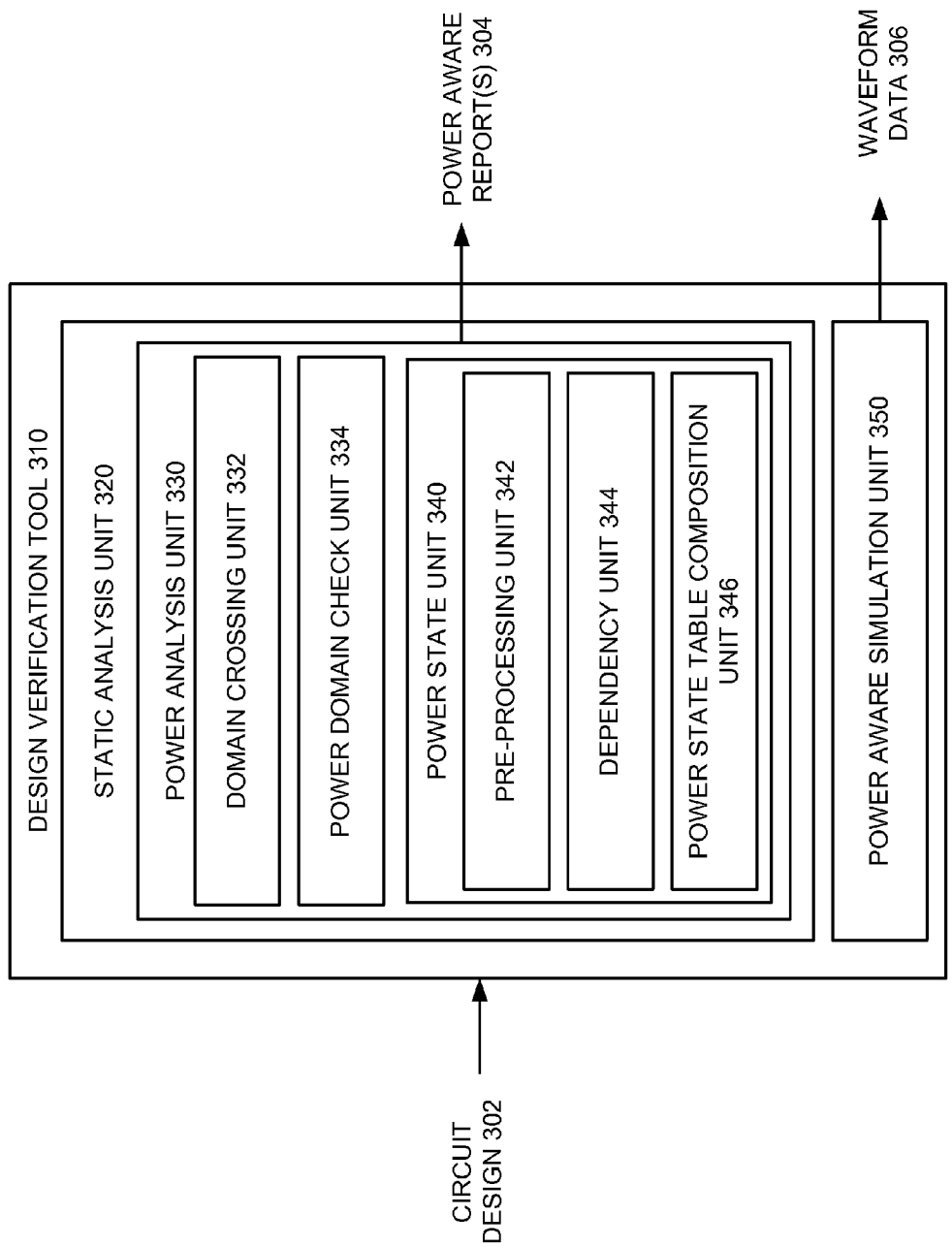
FIG. 3 illustrates an example of a design verification tool to implement power aware static checks with selective power state table composition according to various embodiments of the invention.

FIG. 3 illustrates an example of a design verification tool 310 to implement power aware static checks with selective power state table composition according to various embodiments of the invention. Referring to FIG. 3, the design verification tool 301 can receive a circuit design 302, which can describe an electronic device both in terms of an exchange of data signals between components in the electronic device, such as hardware registers, flip-flops, combinational logic, or the like, and in terms of logical operations that can be performed on the data signals in the electronic device. The circuit design 302 can model the electronic device at a register transfer level (RTL), for example, with code in a hardware description language (HDL), such as Verilog, Very high speed integrated circuit Hardware Design Language (VHDL), or the like. The circuit design also can be annotated with a power intent specification, for example, expressed as a Unified Power Format (UPF) specification described by Institute of Electrical and Electronics Engineers (IEEE) Standard 1801. The power intent specification can include description of various power domain-related design intentions, such as power supply nets, power states, power controls, electrical protection schemes, memory retention schemes, or the like. In some embodiments, the design verification tool 310 can receive the circuit design 302 from a source external to the design verification tool 310, such as a user interface of the computing device 101, another tool implemented by the computing device 101, or the design verification tool 310 may internally generate the circuit design 302.

The design verification tool 301 can include a static analysis unit 320 to perform static checks on the circuit design 302, for example, prior to a power aware simulation of the circuit design 302. The static analysis unit 320 can include a power analysis unit 330 to analyze the circuit design 302 to determine whether the power intent specification in the circuit design 302 describes adequate power domain interface circuitry, such as isolation cells and level-shifting cells, for the electronic device. The power analysis unit 330 can generate at least one power aware report 304 to identify any possible errors in power intent specification, or suggest additions and/or modifications for the power intent specification.

Since different power domains in the electronic device modeled by the circuit design 302 can operate in different states due to their utilization of different power supplies, the power analysis unit 330 can include a domain crossing unit 332 to partition or group the circuit design 302 based on the various power domains described in the power intent specification of the circuit design 302, and then identify any cells or circuitry in different power domains that can communicate with each other. The locations where cells or circuitry in different power domains can communicate with each other, sometimes called power domain crossings or power domain interconnections, can be potential locations for inclusion of interface circuitry in the electronic device modeled by the circuit design 302.

The power analysis unit 330 can include a power domain check unit 334 to determine whether the electronic device modeled by the circuit design 302 should include interface circuitry at power domain crossings. In some embodiments, the power analysis unit 330 can identify a combination of power supplies associated with each power domain crossing, and analyze one or more power states corresponding to the combinations of power supplies to determine whether interface circuitry should be included at the power domain crossings. For example, when the power states indicate that one power domain can be off, while the other can be on, the power domain check unit 334 can determine that isolation circuitry should be included at a power domain crossing between those power domains.

The power analysis unit 330 can include a power state unit 340 to identify a power state table that includes power states corresponding to the combinations of power supplies identified by the power domain check unit 334, and provide the power state table to the power domain check unit 334 for use in determining whether interface circuitry should be utilized at power domain crossings. In some embodiments, the power intent specification of the circuit design 302 may not include a power state table having power states corresponding to a particular combination of power supplies identified by the power domain check unit 334. In these situations, the power state unit 340 can attempt to compose multiple power state tables together to generate a composite power state table having power states corresponding to the particular combination of power supplies identified by the power domain check unit 334.

The power state unit 340 can include a pre-processing unit 342 to analyze the power state tables in the power intent specification of the circuit design 302 and filter out any power state table or individual power states that may be unusable by the power domain check unit 334. For example, the pre-processing unit 342 can review power state tables to determine whether they specify consistent power states for common power supplies. When pre-processing unit 342 identifies one or more power state aberrations between power state tables for common power supplies, the pre-processing unit 342 can exclude the aberrant power states from further utilization by the power domain check unit 334 and mark them for inclusion into a power aware report 304. The pre-processing unit 342 also can identify duplicate power state tables, which can be excluded from being provided to the power domain check unit 334. Embodiments of pre-processing the power state tables will be described below in greater detail.

The power state unit 340 can include a dependency unit 344 to correlate power state tables in the circuit design 302 that have power states corresponding to one or more shared power supplies. In some embodiments, the dependency unit 344 can generate a dependence graph, which correlates the power state tables corresponding to their shared power supplies. The dependence graph can be a software construct including multiple objects representing corresponding power state tables and including multiple bi-directional arcs coupling between objects, which can represent the power supplies shared between the objects. Embodiments of dependency graphing will be described below in greater detail.

The power state unit 340 can include a power state table composition unit 346 to combine subsets of the power state tables to generate different composite power state tables. For example, given a particular combination of power supplies from the power domain check unit 334, the power state table composition unit 346 can utilize the dependence graph to select a subset of the power state tables that, when composed together, can include power states corresponding to the particular combination of power supplies. Since the dependence graph may be able to provide multiple different subsets of power state tables, in some embodiments the power state table composition unit 346 can utilize the dependence graph to select one of the subsets of power state tables that reduces or minimizes consumption of the design verification tool resources, such as processing resources, memory resource, or to reduce or minimize power domain checking time. For example, the power state table composition unit 346 can utilize the dependence graph to identify a subset of power state tables with the fewest power state tables to combine, with a smallest estimated resultant table, with a quickest estimated compositing time, or the like. Embodiments of composing power state tables will be described below in greater detail.

After identifying the interface circuitry that should be included in the electronic device, the power domain check unit 334 can determine whether the power intent specification in the circuit design 302 models the identified interface circuitry. In other words, the power domain check unit 334 can determine what interface circuitry the electronic device should include and then determine whether the power intent specification in the circuit design 302 modeling the electronic device describes an intention for the electronic device to include that interface circuitry. The power domain check unit 334 can identify any discrepancies between the interface circuitry the electronic device should include and what interface circuitry the power intent specification in the circuit design 302 models, which can be included in one or more power aware reports 304.

The power analysis unit 330 also can include a listing of the power states from a power state table or composite power state table in the power aware reports 304, along with any results corresponding to the individual power states. In some embodiments, the power analysis unit 330 can reduce the listing of power states in the power aware reports 304 to include those power supplies utilized by the power domain check unit 334. For example, when the power domain check unit 334 analyzes power states corresponding to power supplies A and B with a power state table or a composite power state table having power states corresponding to power supplies A, B, and C, the power analysis unit 330 can selectively remove power supply C from the power state table or the composite power state table and include a listing of power states corresponding to power supplies A and B in the power aware reports 304.

The design verification tool 310 can include a power aware simulation unit 350 to synthesize the interface circuitry from the power intent specification into the circuit design 302, for example, by generating code corresponding to the interface circuitry at the register transfer level and incorporating it into the circuit design 302 prior to simulation of the circuit design 302. In some embodiments, the power aware simulation unit 350 can receive a test bench, which during simulation, can generate a set of test stimuli capable of being utilized to functionally verify the circuit design 302, for example, by providing test scenarios to determine whether the circuit design 302 can function as expected. The power aware simulation unit 350 can generate waveform data 306, which can correspond to a simulated output created by the circuit design 302 during simulation with the test bench. The design verification tool 310 (or a tool external to the design verification tool 310) can perform functional verification for the circuit design 302, for example, by comparing the waveform data 306 with an expected output from the circuit design 302 in response to test stimuli generated by the test bench during simulation.

Figure 4:
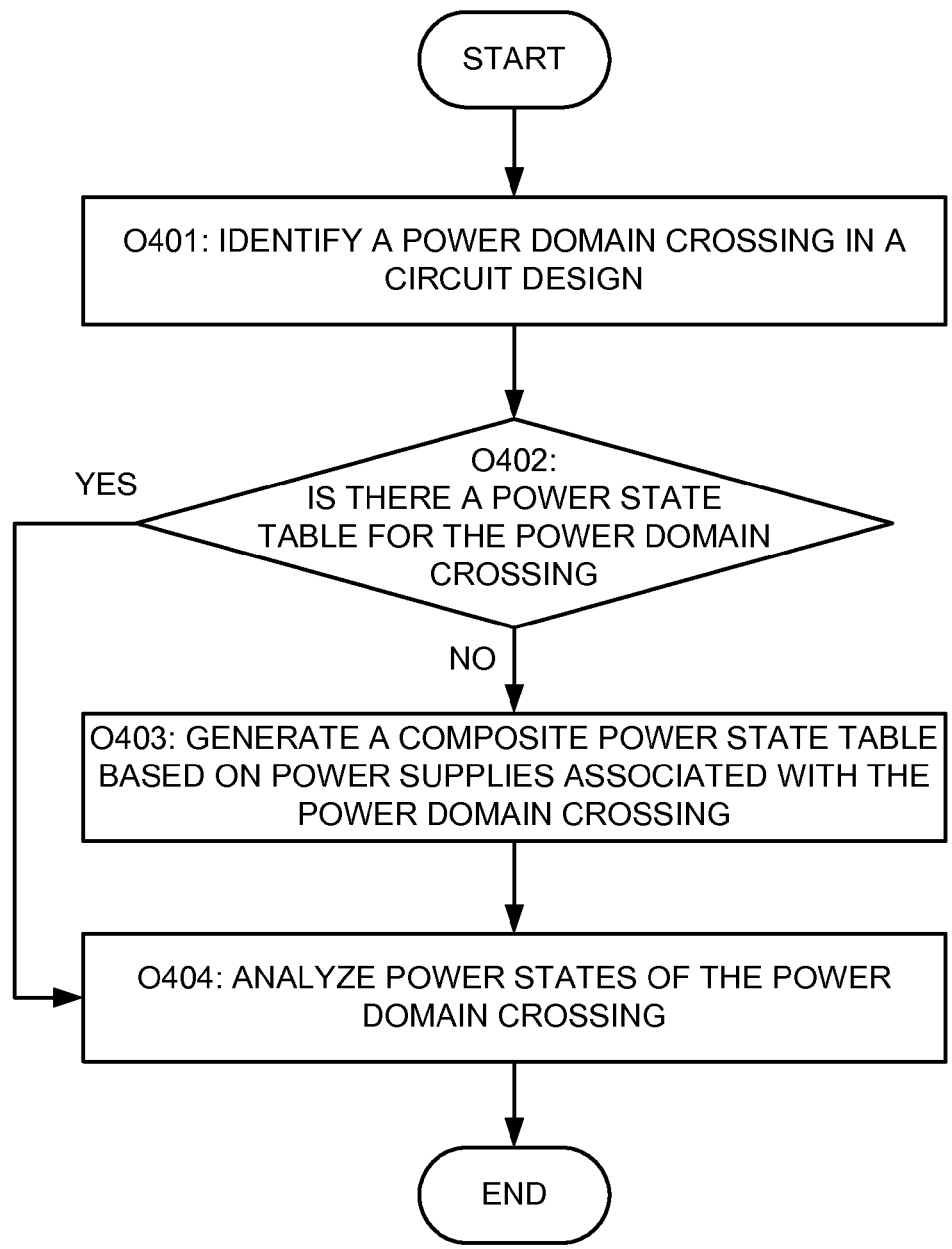
FIG. 4 illustrates a flowchart showing an example implementation of power aware static checks with selective power state table composition according to various examples of the invention.

FIG. 4 illustrates a flowchart showing an example implementation of power aware static checks with selective power state table composition according to various examples of the invention. Referring to FIG. 4, in a block 401, a design verification tool can identify a power domain crossing in a circuit design. To identify the power domain crossing, in some embodiments, the design verification tool can partition or group the circuit design based on the various power domains described in a power intent specification of the circuit design, and identify any interconnections between in different power domains. The interconnections between different power domains can correspond to power domain crossings.

In a block 402, the design verification tool can determine whether the circuit design includes a power state table for the power domain crossing. The design verification tool can identify a group of power supplies associated with the power domain crossing or associated with the different power domains corresponding to the power domain crossing. The design verification tool can review the power state tables present in the power intent specification to determine whether any power state table includes power states for the group of power supplies.

When the power intent specification includes a power state table having power states for the group of power supplies, in a block 404, the design verification tool can analyze power states of the power domain crossing with the power state table. In some embodiments, the design verification tool can utilize the power state table to determine whether the interface circuitry, such as isolation circuitry or level-shifting circuitry, should be included at the power domain crossing based on the power states of the power domains.

When the power intent specification does not include a power state table having power states for the group of power supplies, in a block 403, the design verification tool can generate a composite power state table based on the group of power supplies associated with the power domain crossing. In some embodiments, the design verification tool can utilize the group of power supplies to identify multiple power state tables that can be combined via one or more shared power supplies. For example, the design verification tool can identify relationships between power state tables, such as shared power supplies, which allow them to be combined, and then find one or more subsets of the power state tables that, when combined based on the shared power supplies, would result in a composite power state table having power states corresponding to the group of power supplies.

Once the composite power state table has been generated, in the block 404, the design verification tool can analyze power states of the power domain crossing with the composite power table. In some embodiments, the analysis of the power states for the power domain crossing with the composite power state table can be similar to the above-described analysis performed with an uncombined power state table.

Figure 5:
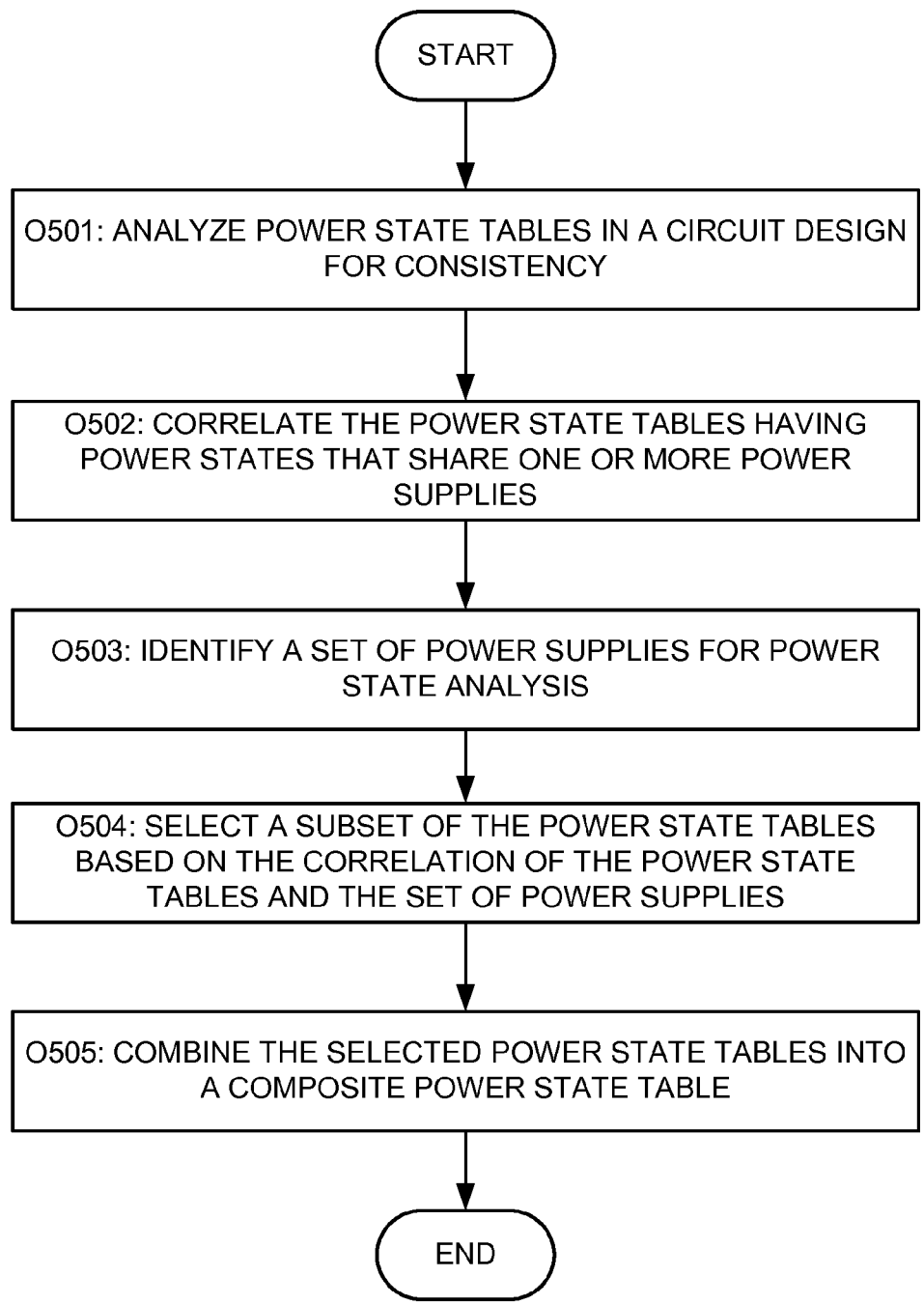
FIG. 5 illustrates a flowchart showing an example implementation of selective power state table composition according to various examples of the invention.

FIG. 5 illustrates a flowchart showing an example implementation of selective power state table composition according to various examples of the invention. Referring to FIG. 5, in a block 501, a design verification tool can analyze power state tables in a circuit design for consistency. In some embodiments, the circuit design can include the power state tables in a power intent specification of the circuit design, and the design verification tool can review the power intent specification to analyze the power state tables for consistency. The design verification tool can filter out any power state table or individual power states that may be unusable, for example, due to duplication of power state tables or inconsistent description of operational states for common power supplies, i.e., one power state table includes operational states for an individual power supply inconsistent with another power state table.

In a block 502, the design verification tool can correlate the power state tables having power states that share one or more power supplies. In some embodiments, the design verification tool can identify power state tables that share at least one power supply, and correlate those identified tables based on the shared power supply. In some embodiments, the design verification tool can generate a dependence graph, which correlates the power state tables corresponding to their shared power supplies. The dependence graph can be a software construct including multiple objects representing corresponding power state tables and including multiple bi-directional arcs coupling between objects, which can represent the power supplies shared between the objects.

In a block 503, the design verification tool can identify a set of power supplies for power state analysis. In some embodiments, the set of power supplies can correspond to a power domain crossing or associated with the different power domains corresponding to the power domain crossing.

In a block 504, the design verification tool can select a subset of the power state tables based on the correlation of the power state tables and the set of power supplies. Since power state tables with a common power supply can be combined, in some embodiments, the design verification tool can locate power state tables that include one or more of the power supplies in the set of power supplies, and then determine whether some of those power state tables can be combined, by virtue of at least one common supply, to form a composite power state table having power states for the set of power supplies.

In a block 505, the design verification tool can combine the selected power state tables into a composite power state table. In some embodiment, the design verification tool can combine the selected power state tables at the same time, while in other implementations, the combination can be staged or nested.

Figure 6A:
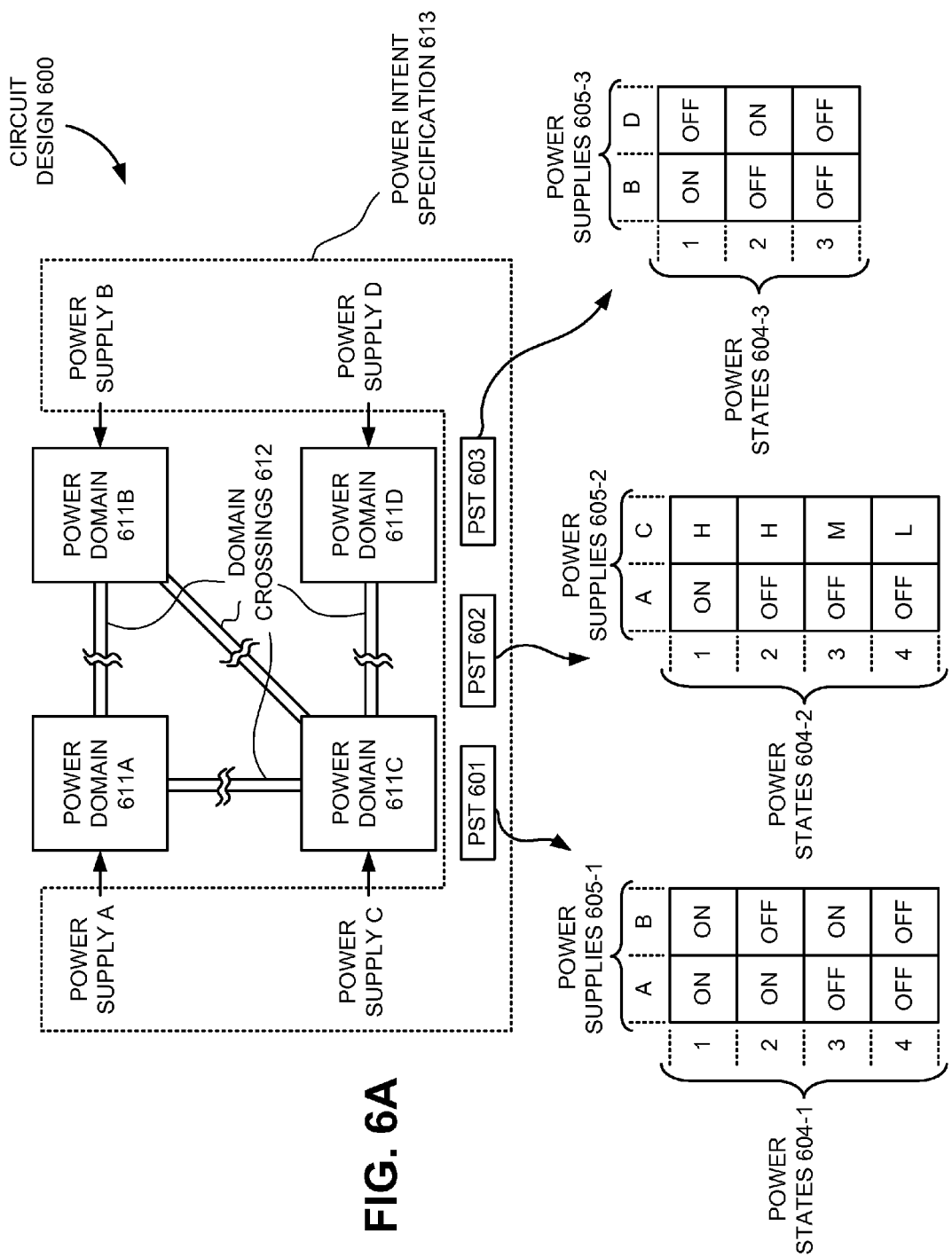
FIGS. 6A-6E illustrate an example of selective power state table composition according to various embodiments of the invention.

FIGS. 6A-6E illustrate an example of selective power state table composition according to various embodiments of the invention. Referring to FIG. 6A, a circuit design 600 can include multiple power domains 611A-611D, which can be variously interconnected via domain crossings 612. The circuit design 600 can include a power intent specification 613, for example, expressed as a Unified Power Format (UPF) specification described by Institute of Electrical and Electronics Engineers (IEEE) Standard 1801. The power intent specification 613 can include description of various power domain-related design intentions, such as power supply nets, power states, power controls, electrical protection schemes, memory retention schemes, or the like. For example, the power intent specification 613 can specify a power supply A be provided to the power domain 611A, a power supply B be provided to the power domain 611B, a power supply c be provided to the power domain 611C, and a power supply D be provided to the power domain 611D. The power intent specification can also include multiple power state tables 601-603, which can describe power states for different combinations of the power supplies A-D.

The power state table 601 can be configured in a row-column format with each column corresponding different power supplies 605-1 and each row corresponding to different power states 604-1 of the power supplies 605-1. For example, the power state table 601 can include power supply A in a first column and power supply B in a second column, while the power states 604-1 can show various combinations of operational states of the individual power supplies.

The power state table 602 can be configured in a row-column format with each column corresponding different power supplies 605-2 and each row corresponding to different power states 604-2 of the power supplies 605-2. For example, the power state table 602 can include power supply A in a first column and power supply C in a second column, while the power states 604-2 can show various combinations of operational states of the individual power supplies.

The power state table 603 can be configured in a row-column format with each column corresponding different power supplies 605-3 and each row corresponding to different power states 604-3 of the power supplies 605-3. For example, the power state table 603 can include power supply B in a first column and power supply D in a second column, while the power states 604-3 can show various combinations of operational states of the individual power supplies.

Figures 6B, 6C:
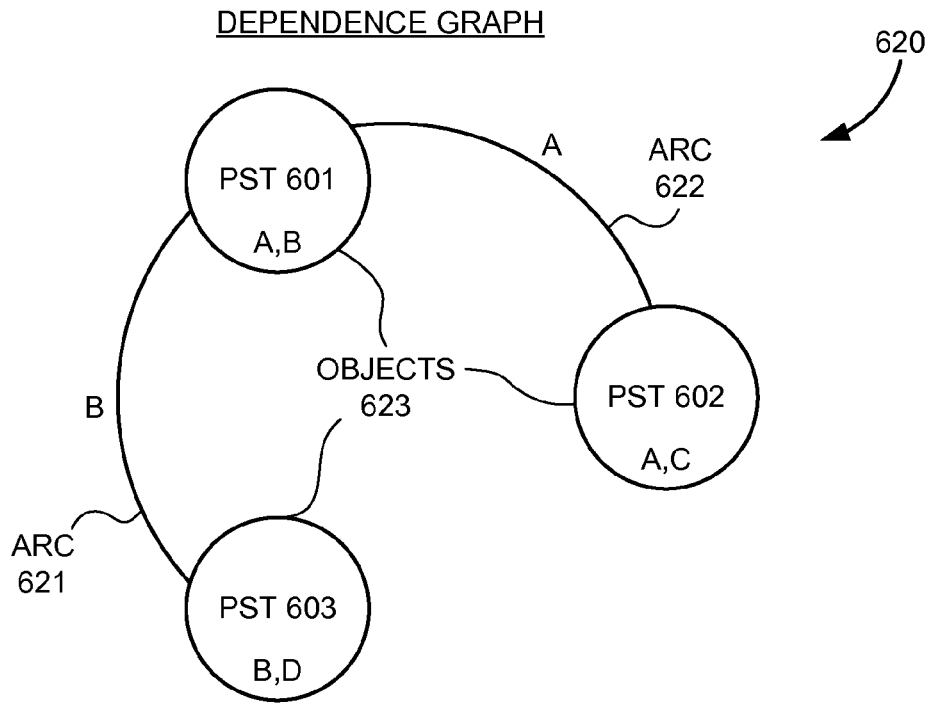

Referring to FIG. 6B, a dependence graph 620 can be a representation of the power state tables 601-603 with in the power intent specification 613 of the circuit design 600 of FIG. 6A. The dependence graph 620 can annunciate or identify relationships between the power state tables 601-603, for example, based on which power supplies may be shared between the power state tables 601-603.

In some embodiments, the dependence graph can be a software construct including multiple objects 623 representing corresponding power state tables 601-603 and including multiple bi-directional arcs 621 and 622 coupling between objects 623, which can represent the power supplies shared between the objects 623. In the instant example, since power state tables 601 and 602 both include power states that include power supply A, the dependence graph 620 can include an arc 622 between the power state tables 601 and 602 to identify power state tables 601 and 602 include a common power supply, namely, power supply A. Furthermore, since power state tables 601 and 603 both include power states that include power supply B, the dependence graph 620 can include an arc 621 between the power state tables 601 and 603 to identify power state tables 601 and 603 include a common power supply, namely, power supply B.

A design verification tool can utilize the dependence graph 620 to identify a subset of the power state tables 601-603 to combine into a composite power state table. For example, when the design verification tool intends to analyze power states for power supplies B and C, the design verification tool can determine that no individual power state table includes those states currently and then utilize the dependence graph 620 to ascertain if a subset of the power state tables 601-603 can be combined into a composite power state table having power states power states for power supplies B and C. In the instant example, the design verification tool can utilize the dependence graph 620 to identify that a combination of power state tables 601 and 602 can be combined into a composite power state table having power states power states for power supplies B and C.

Referring to FIG. 6C, a combinational table 630 illustrates various possible power supply combinations 631 that a design verification tool may encounter in evaluating the circuit design 600, for example, during a static check of the power intent specification 613 and the circuit design 600. The combinational table 630 also illustrates various power state table compositions 632 that a design verification tool can utilize for each of the power supply combinations 631. In some embodiments, the design verification tool can determine the power state table compositions 632 on-the-fly, for example, in response to identifying a power supply combination 631 during a static check. In other embodiments, the design verification tool can determine the power state table compositions 632 first, and then begin identifying the power supply combinations 631 from the circuit design 600.

Figure 6D:
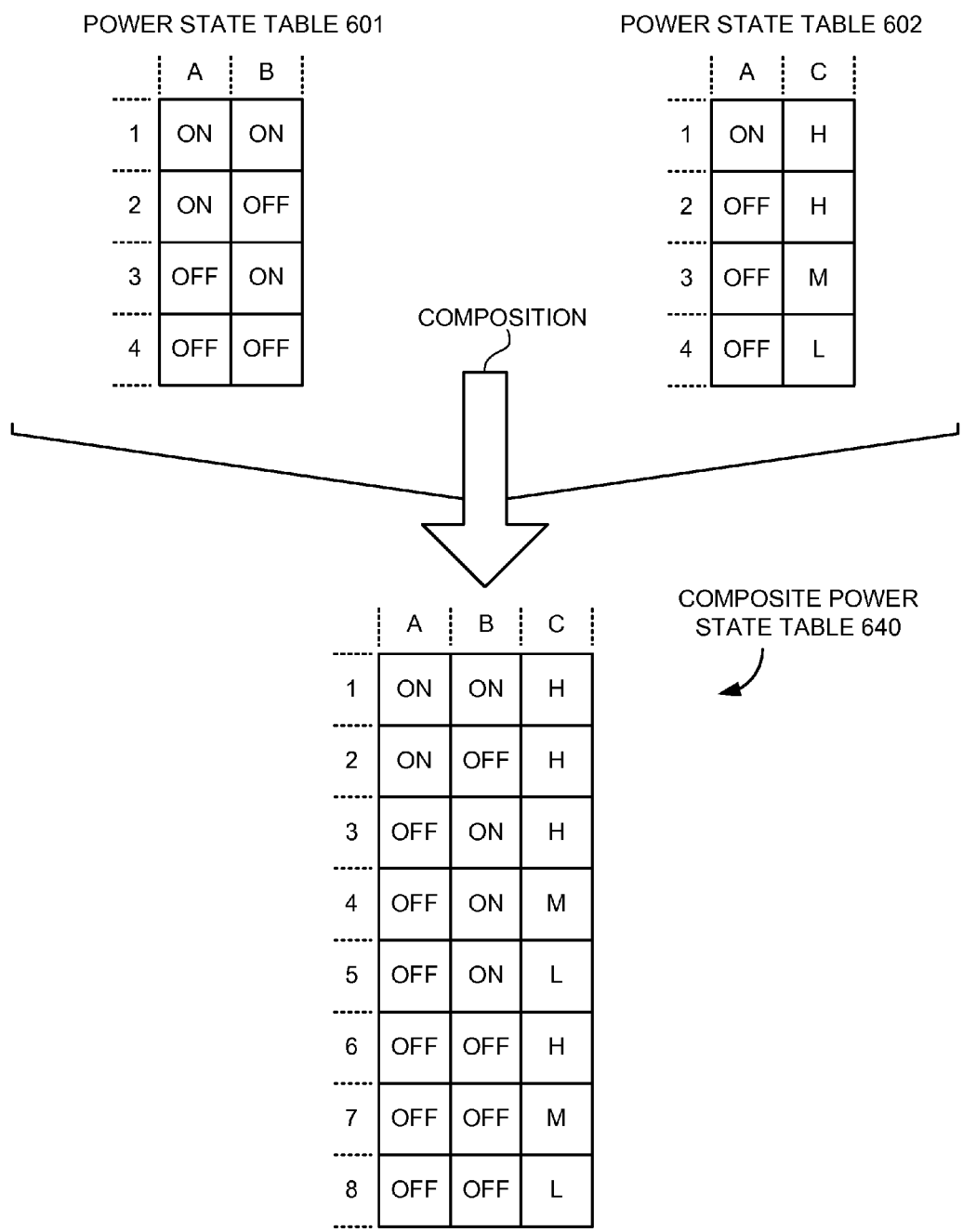

Referring to FIG. 6D, an example composition of power state tables 601 and 602 is shown. Since power state tables 601 and 602 include a common power supply, namely, power supply A, a design verification tool can combine the power states in each of the tables based on the operational states of the power supply A. For example, when power supply A is in an ON state, power state table 601 indicates power supply B can be in an ON or OFF state, while power state table 602 indicates power supply C is in a high H state. The design verification tool can combine the power states when power supply A is in an ON state into two power states of a composite power state table 640, i.e., power states 1 and 2 in the composite power state table 640.

Figure 6E:
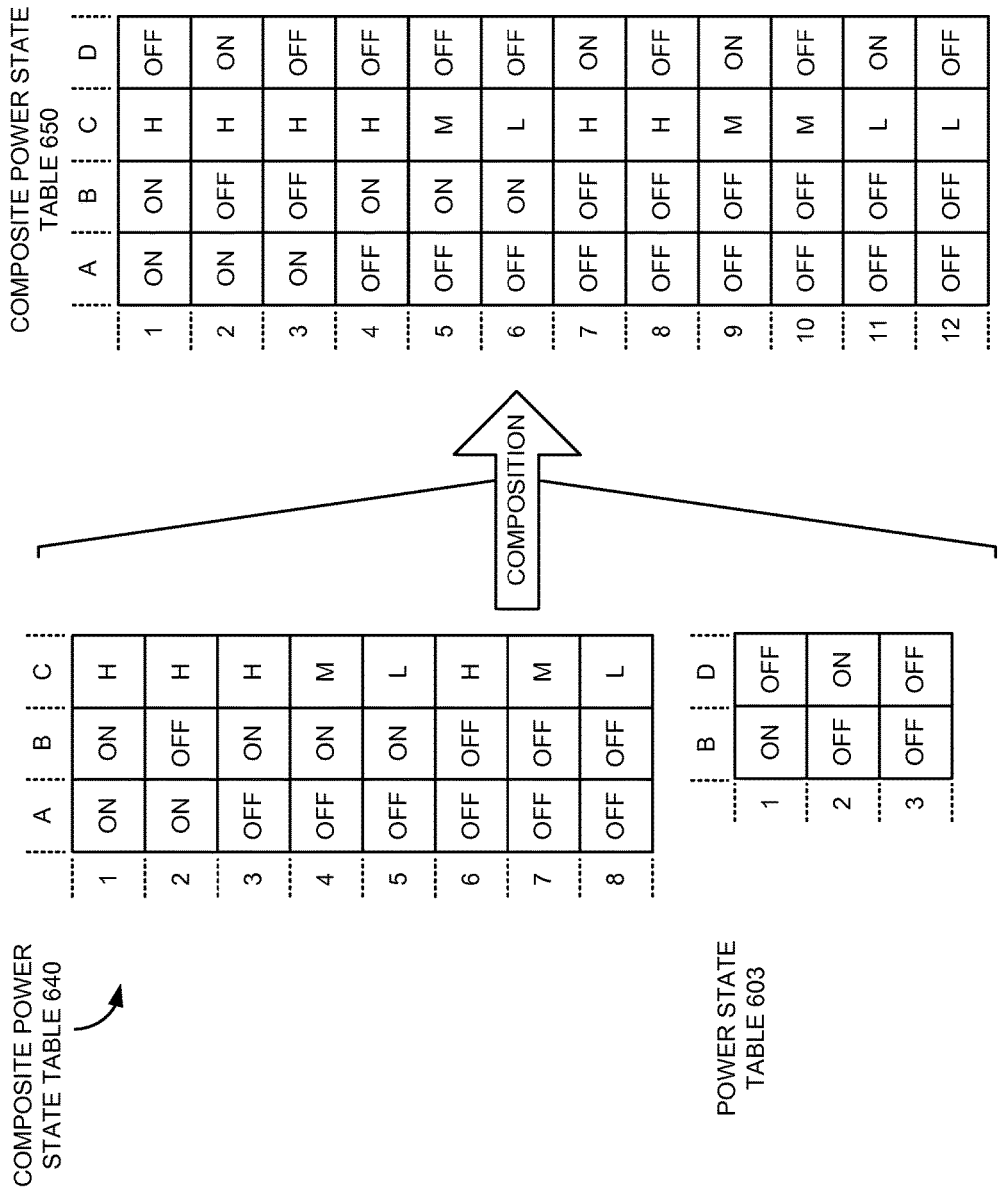

Referring to FIG. 6E, an example of nested power state table composition is shown. A design verification tool can combine power state tables in a nested fashion, for example, combining a first group of power state tables, and then combining the composite power state table 640 with a second group of one or more power state tables. The design verification tool can generate composite power state table 640 on-the-fly for the nested power state table composition, or the design verification tool can access a stored version of the composite power state table 640, for example, generated in a previous analysis of the circuit design 600. In some embodiments, the design verification tool can determine which power state tables to combine in each stage of the nested composition based on power state table locations in the dependence graph 620. For example, the design verification tool can locate a path of power state tables in the dependence graph 620 to combine, and the design verification tool can incrementally combine the different power state tables in the path, such as in a one-after-another approach, until all power state tables in the path have been combined.

The design verification tool also can group power state tables for combination that have a common power supply. For example, the design verification tool can identify a subset of the power state tables to combine, for example, in a path of the dependence graph 620, and then group the power state tables by common power supply. The design verification tool can combine a first group of power state tables having a first common power supply, and then combine the composite power state table with a second group of power state tables having a second common power supply, and so on, until the design verification tool generates the composite power state table. In some embodiments, the design verification tool can combine a first group of power state tables having a first common power supply, combine a second group of power state tables having a second common power supply, and then combine both combined groups together.

In the instant example, the design verification tool can combine the composite power state table 640 and power state table 603 via their common power supply, namely, power supply B, to form a composite power state table 650. Although FIG. 6E, illustrates a nested compositional strategy, in some embodiments, a design verification tool can combine all power state tables in an identified subset of power state tables together all at once.

Figure 7A:
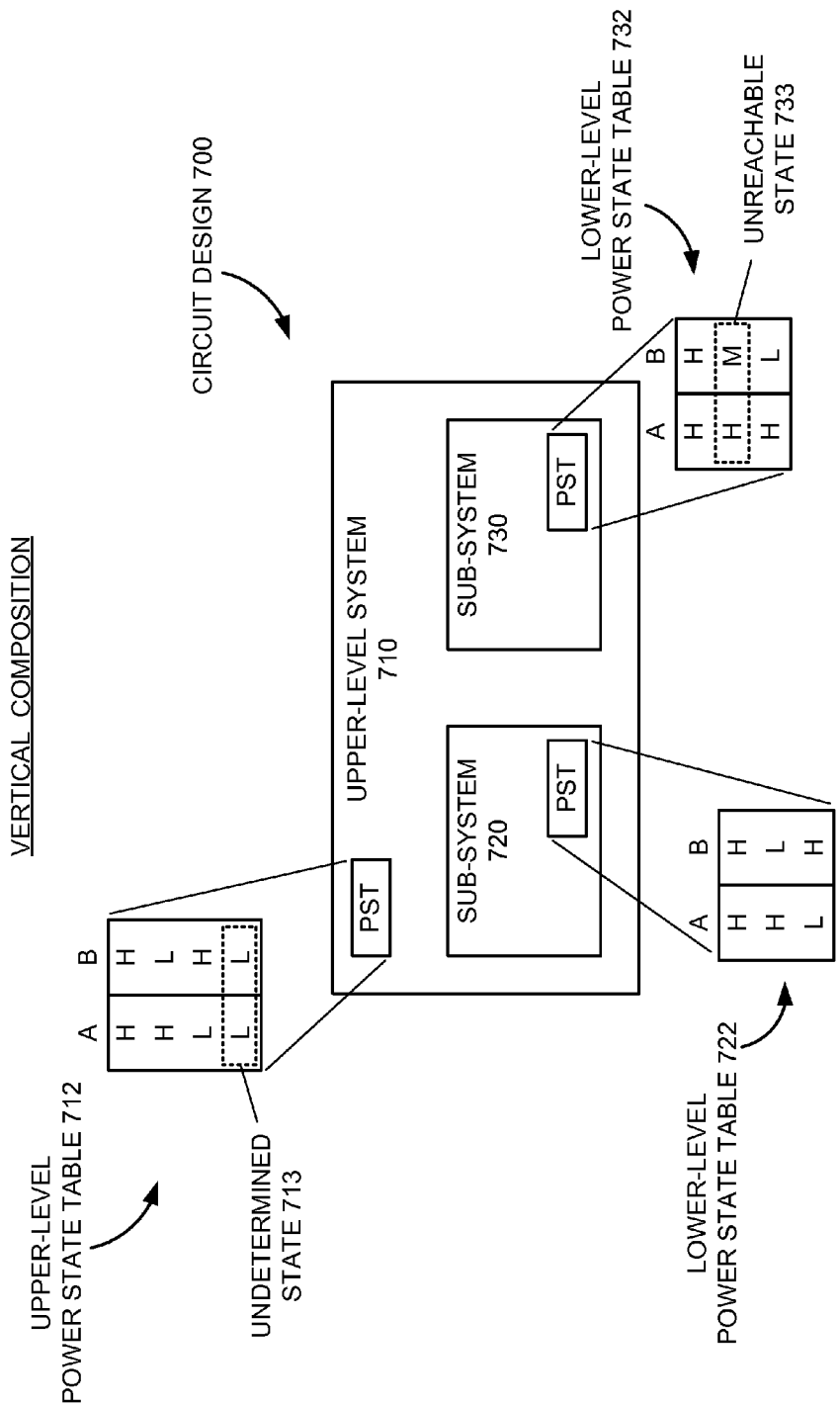
FIGS. 7A and 7B illustrate examples of pre-processing checks for power state tables utilized in selective power state table composition according to various embodiments of the invention.
Figure 7B:
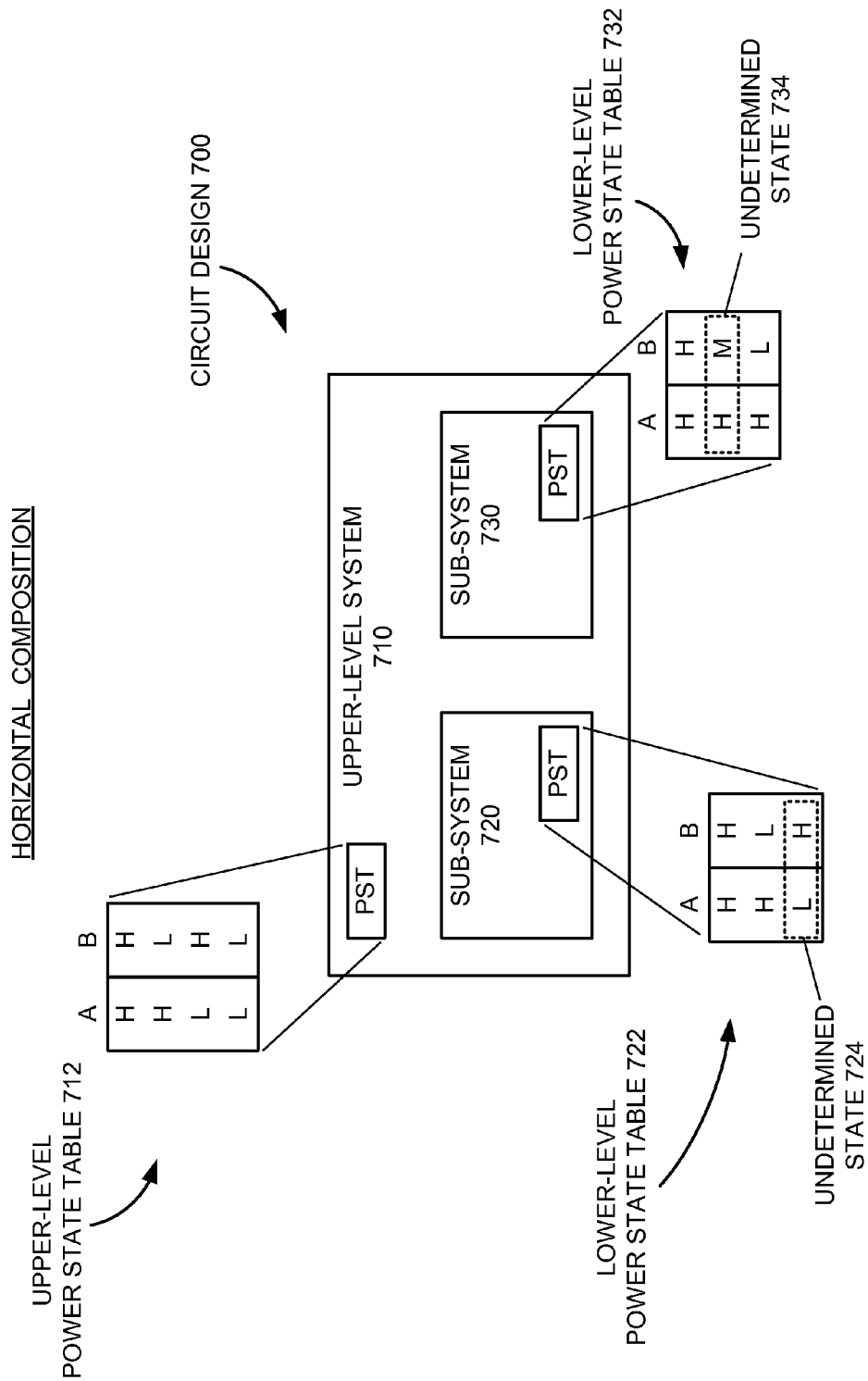

FIGS. 7A and 7B illustrate examples of pre-processing checks for power state tables utilized in selective power state table composition according to various embodiments of the invention. Referring to FIGS. 7A and 7B, a circuit design 700 can include an upper-level system 710 having a corresponding power state table 712. The upper-level system 710 can include multiple sub-systems 720 and 730 having corresponding power state tables 722 and 732, respectively.

A design verification tool can perform pre-processing on the power state tables 712, 722, and 732 to determine whether the power state tables 712, 722, and 732 include any undetermined or unreachable power states. An unreachable power state can correspond to a power state in a lower-level power state table that is not present in an upper-level power state table for that system. Since a vertical composition of the upper-level power state table and the lower-level power state table with the unreachable state may introduce errors in the resulting composite power state table, the design verification tool can ignore the unreachable state during composition. The design verification tool also can mark the power state as unreachable, and/or issue a warning that identifies the presence of the unreachable power state. In the instant example, the lower-level power state table 732 includes a power state 733, PowerState(A,B)=(H,M), which is not included in the upper-level power state table 712 and thus considered by the design verification tool as unreachable.

An undetermined power state can correspond to a power state in an upper-level power state table that is not present in a lower-level power state table for that system, or a power state in one lower-level power state table that is not present in another lower-level power state table. Since a vertical composition of the upper-level power state table and the lower-level power state table or a horizontal composition of two lower-level power state table with the undetermined state may introduce errors in the resulting composite power state table, the design verification tool can ignore the undetermined state during composition. The design verification tool also can mark undetermined power states, and/or issue a warning that identifies the presence of the undetermined power state.

In the instant example, the upper-level power state table 712 includes a power state 713, PowerState(A,B)=(L,L), which is not included in the lower-level power state tables 722 and 732, thus considered by the design verification tool as undetermined. The lower-level power state table 722 includes a power state 724, PowerState(A,B)=(L,H), which is not included in the lower-level power state table 732, thus considered by the design verification tool as undetermined. The lower-level power state table 732 includes a power state 734, PowerState(A,B)=(H,M), which is not included in the lower-level power state table 722, thus considered by the design verification tool as undetermined.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   identifying, by a computing device, an interconnection between portions of a circuit design corresponding to different power domains;
   correlating, by the computing system, power state tables in the circuit design having power states that correspond to one or more shared power supplies associated with the interconnection;
   utilizing, by the computing system, the correlated power state tables to select a subset of power state tables in the circuit design to combine into a composite power state table based, at least in part, on power supplies associated with the interconnection; and
   analyzing, by the computing system, the interconnection between the portions of the circuit design corresponding to the different power domains based, at least in part, on power states in the composite power state table.

2. The method of claim 1, wherein analyzing the interconnection further comprises:
   identifying electrical characteristics for the interconnection based, at least in part, on power states in the composite power state table; and
   determining whether a power intent specification in the circuit design is configured to prompt synthesis of interface circuitry capable of implementing the identified electrical characteristics.

3. The method of claim 2, wherein the interface circuitry is configured to electrical isolate the portions of the circuit design corresponding to the different power domains or to level shift a voltage exchanged between the portions of the circuit design corresponding to the different power domains.

4. The method of claim 2, further comprising issuing, by the computing system, an error message when the power intent specification in the circuit design fails to specify interface circuitry that implements the identified electrical characteristics.

5. The method of claim 1, wherein correlating the power state tables further comprises generating a dependence graph that defines relationships between the power supply tables according to their shared power supplies to provide a minimal subset of the power state tables in the circuit design to combine into the composite power state table.

6. The method of claim 1, further comprising:
   identifying, by the computing system, one or more power state tables having an unreachable power state or an undetermined power state; and
   generating, by the computing system, the composite power state table from the selected subset of power state tables in the circuit design, wherein power states from the composite power state table corresponding to the unreachable power state or the undetermined power state are excluded from the composite power state table.

7. An apparatus comprising at least one computer-readable memory device storing instructions configured to cause one or more processing devices to perform operations comprising:
   comparing power states of multiple power state tables in a power intent specification of a circuit design;
   identifying one or more power state tables having an unreachable power state or an undetermined power state based on the comparison;
   correlating the power state tables in the circuit design having power states that correspond to one or more shared power supplies;
   utilizing the correlated power state tables to select a subset of the power state tables in the circuit design to combine into a composite power state table having power states that correspond to a group of power supplies, while excluding power states corresponding to the unreachable power state or the undetermined power state; and
   performing power state analysis on a portion of the circuit design associated with the group of power supplies based, at least in part, on the composite power state table.

8. The apparatus of claim 7, wherein the instructions are configured to cause one or more processing devices to perform operations further comprising issuing an error message to identify the power state tables having the unreachable power state or the undetermined power state.

9. The apparatus of claim 7, wherein performing power state analysis on a portion of the circuit design associated with the group of power supplies further comprising:
   identifying electrical characteristics for the portion of the circuit design based, at least in part, on the power states in the composite power state table; and
   determining whether a power intent specification in the circuit design is configured to prompt synthesis of circuitry capable of implementing the identified electrical characteristics.

10. The apparatus of claim 9, wherein the circuitry is configured to electrical isolate the portion of the circuit design or to level shift voltage exchanged in the portion of the circuit design.

11. The apparatus of claim 7, wherein the portion of the circuit design corresponds to an interconnection between circuitry in different power domains of the circuit design.

12. An apparatus comprising at least one computer-readable memory device storing instructions configured to cause one or more processing devices to perform operations comprising:
   correlating power state tables in a circuit design having power states that correspond to one or more shared power supplies;
   utilizing the correlated power state tables to select a subset of the power state tables in the circuit design to combine into a composite power state table having power states that correspond to a group of power supplies; and
   performing power state analysis on a portion of the circuit design associated with the group of power supplies by identifying electrical characteristics for a portion of the circuit design based, at least in part, on the power states in the composite power state table, and determining whether a power intent specification in the circuit design is configured to prompt synthesis of circuitry capable of implementing the identified electrical characteristics.

13. The apparatus of claim 12, wherein the circuitry is configured to electrical isolate the portion of the circuit design or to level shift voltage exchanged in the portion of the circuit design.

14. The apparatus of claim 12, wherein correlating power state tables in the circuit design further comprises generating a dependence graph identifying each power state table and any corresponding relationships with other power state tables based on the shared power supplies to provide a minimal subset of the power state tables in the circuit design to combine into the composite power state table.

15. The apparatus of claim 12, wherein the portion of the circuit design corresponds to an interconnection between circuitry in different power domains of the circuit design.

16. The apparatus of claim 12, wherein the instructions are configured to cause one or more processing devices to perform operations further comprising combining the selected subset of the power state tables into the composite power state table.

17. The apparatus of claim 12, wherein selecting the subset of the power state tables in the circuit design to combine into the composite power state table is performed when at least one of the power state tables in the circuit design does not include power states corresponding to the group of power supplies.

* * * * *